Jan. 30, 1968  D. D. CAMPBELL  3,366,193
MOTORCYCLE FRAME STRUCTURE
Filed Dec. 16, 1965  2 Sheets-Sheet 1

INVENTOR.
DONALD D. CAMPBELL
BY
Willard S. Groen
ATTORNEY

Jan. 30, 1968   D. D. CAMPBELL   3,366,193

MOTORCYCLE FRAME STRUCTURE

Filed Dec. 16, 1965   2 Sheets-Sheet 2

INVENTOR.
DONALD D. CAMPBELL
BY
Willard S. Groene
ATTORNEY

United States Patent Office 3,366,193
Patented Jan. 30, 1968

3,366,193
MOTORCYCLE FRAME STRUCTURE
Donald D. Campbell, 2701 E. Turney,
Phoenix, Ariz. 85016
Filed Dec. 16, 1965, Ser. No. 523,491
2 Claims. (Cl. 180—32)

ABSTRACT OF THE DISCLOSURE

A motor vehicle frame, particularly for a motorcycle consisting of a tubular or flexible rod structure that is free of all pivoting and sliding parts so as to eliminate noise, rattles and necessity for lubrication of any kind in the frame structure.

---

This invention pertains to motor vehicle frames and is particularly directed to an improved motorcycle frame structure.

One of the objects of this invention is to provide a motorcycle frame structure which is free of all pivoting and sliding parts.

Still another object of this invention is to provide a motorcycle frame structure that is free of all rattles and noise particularly when operated over rough road and ground surfaces.

Still another object of this invention is to provide a motorcycle frame structure which is self contained and an integral unit providing all support and movements for the wheel structures to accommodate their travel over rough surfaces.

Still another object of this invention is to provide an improved motorcycle frame structure which is neat in appearance, simple in construction, and easy to maintain.

Still another object of this invention is to provide an improved motorcycle frame structure which is extremely soft in riding, rigid in durability and rugged in operation even over the roughest ground and road surfaces.

Still another object of this invention is to provide a motorcycle frame structure made of resilient rod of high tensile and springy construction.

Further features and advantages of this invention will appear from a detailed description of the drawings in which.

Figure 1:
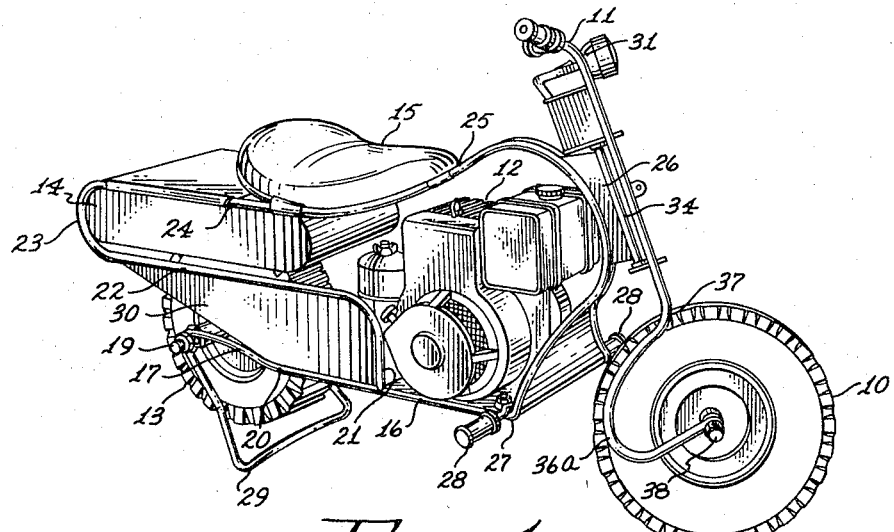
FIG. 1 is a front right hand side perspective view of a motorcycle incorporating the features of this invention.
Figure 2:
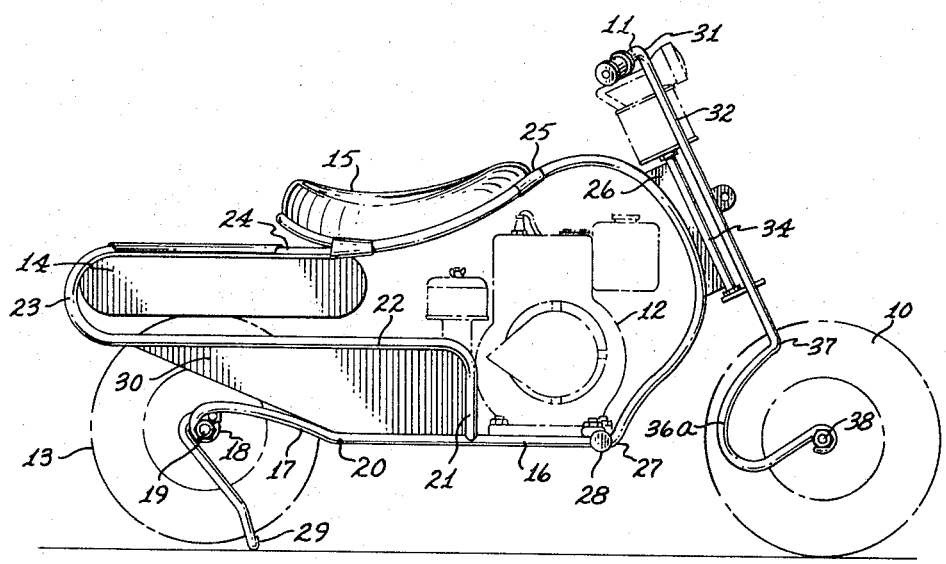
FIG. 2 is a right hand side elevation of the motorcycle of FIG. 1.
Figures 3, 4:
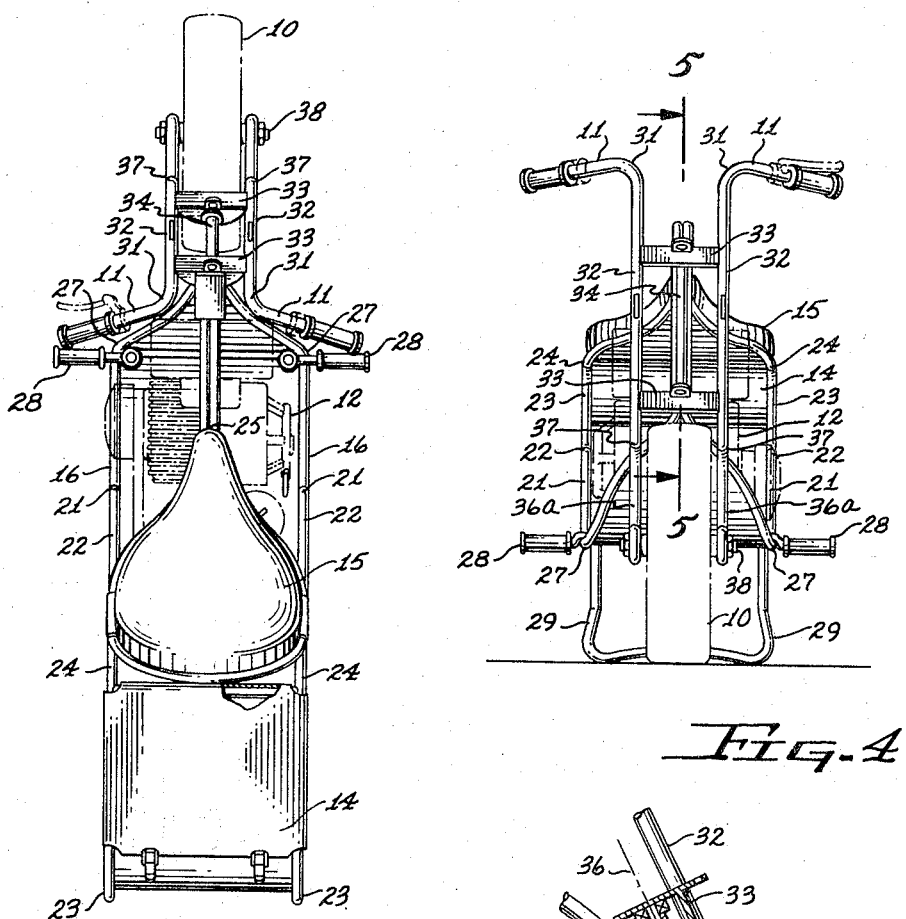
FIG. 3 is a plan view of the motorcycle shown in FIG. 2.
FIG. 4 is a front elevation of the motorcycle shown in FIGS. 2 and 3.
Figure 5:
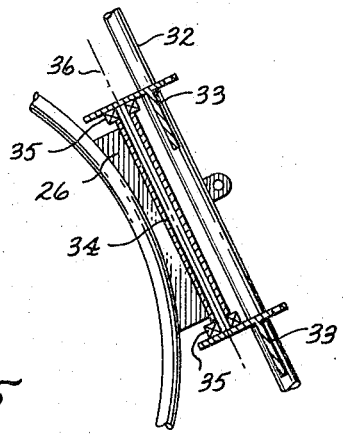
FIG. 5 is an enlarged fragmentary sectional view on the line 5—5 of FIG. 4.

As an example of one embodiment of this invention there is shown a motorcycle having the usual front wheel 10, steering handle bars 11, drive motor 12, rear driven wheel 13, tool box 14, and seat 15, which are connected together in operative relationship by a unique spring steel frame structure comprising a pair of laterally spaced horizontal side members 16 upon which the motor 12 is supported. The side members 16 extend rearwardly and join with upwardly and readwardly sloping portions 17 which terminate at their rear ends 18 which support the axle 19 of the rear driven wheel 13. These portions 18 are arranged to spring up and down rearwardly from the point 20 with the rear wheel as it rolls over bumps and rough ground surfaces to give a soft spring suspended ride from the rear wheel.

Intermediate the ends of the side member 16 is fixed upstanding members 21 to the upper end of which is fixed the laterally spaced rearwardly extending side frame members 22 which have turned-up rear end portions 23 connected with the rear ends of the horizontally laterally spaced tool box and seat carrying members 24 arranged to carry the tool box 14 and the seat 15. The front portions of the members 24 converge at the forward end 25 and curve forwardly and downwardly and are rigidly connected with the steering spindle bearing bracket 26 and then continue to slope downwardly and rearwardly and divergently to connect rigidly with the forward ends 27 of the side members 16, at which point suitable foot support pedals 28 may be mounted. A suitable parking bracket 29 may be mounted to the rear axle 19 as required. Side panels 30 are rigidly secured to the underside of the side frame members 22, the rear portion of the upstanding members 21, and the top portion of the side tubes between the upstanding members 21 and the point of springing 20 of the sloping portions 17 of the side tubes 16.

The handle bars 11 are appropriately connected to the upper ends 31 of the forwardly and downwardly laterally spaced front wheel support members 32 which are rigidly fixed to the bearing brackets 33 which in turn are connected to the bearing shaft 34 pivotally mounted on suitable bearing 35 on the bracket 26 so as to swing about the steering axis 36. The lower ends 37 of the support members 32 terminate in C-shaped portions $36_a$ to the outer ends of which is mounted the axle 38 so that there is relative springy movement between the axle 38 and the lower ends of the support members 32 for easy and soft riding for the motorcycle. Thus in the apparatus described there are no pivoted and sliding surfaces in operation for the spring suspension system of the wheel while the yielding suspension system and the frame structure of the vehicle is one unitary structure.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A frame structure for a motorcycle having:
   (A) a front wheel,
   (B) handle bars,
   (C) a drive motor,
   (D) a rear drive wheel,
   (E) and a seat,
   (F) a resilient frame supporting said elements of (A), (B), (C), (D), and (E) above in operative relationship comprising,
   (G) a pair of laterally spaced horizontal side members arranged to operatively support said motor,
   (H) upwardly and rearwardly sloping portions connected to and extending rearwardly from the rear ends of said side members,
   (I) means to rotatively support said rear drive wheel on the rear ends of said upwardly and rearwardly sloping portions so that said rear wheel has yielding up and down movement relative to said frame,
   (J) upstanding members fixed to intermediate portions of said side members,
   (K) laterally spaced rearwardly extending side frame members fixed to the upper ends of said upstanding members,
   (L) turned-up rear end portions on the rear ends of said laterally spaced rearwardly extending side frame members, (M) forwardly extending laterally spaced horizontal tool box and seat carrying members connected at their rear ends to said turned-up rear end portions, and converging forwardly in front of the seat and then curving forwardly and downwardly and then sloping rearwardly and downwardly and divergently to connect rigidly with the forward ends of said side members, (N) a steering spindle bearing bracket fixed to the forward and downward sloping portion of said tool box and seat carrying members, (O) and means for pivotally mounting said handle bars and front wheel on said bracket.

2. In a frame structure for a motorcycle as set forth in claim 1 wherein said mounting means for said handle bars and front wheel comprises:

(P) a pair of forwardly and downwardly extending laterally spaced front wheel support members having said handle bars fixed to the upper ends thereof, (Q) a bracket fixed to said pair of said wheel support members and pivotally mounted on said steering spindle bearing bracket, (R) and C-shaped portions of the lower ends of said front wheel support members for rotatably supporting said front wheel in operative position.

References Cited

UNITED STATES PATENTS

| | | | |
|---|---|---|---|
| 453,053 | 5/1891 | Teetor | 280—275 |
| 2,194,103 | 3/1940 | Tibbals | 280—283 |
| 3,096,997 | 7/1963 | Merry | 280—275 |
| 3,212,791 | 10/1965 | Edwins | 180—32 |

FOREIGN PATENTS 183,758  4/1918  Canada.

KENNETH H. BETTS, *Primary Examiner.*